United States Patent
Hanrahan et al.

(10) Patent No.: US 7,190,555 B2
(45) Date of Patent: Mar. 13, 2007

(54) MICRO-HUB SWAGE MOUNT FOR ATTACHMENT OF SUSPENSION ASSEMBLY IN HARD DISK DRIVE

(75) Inventors: Kevin Hanrahan, Santa Barbara, CA (US); Ryan Schmidt, Santa Barbara, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 406 days.

(21) Appl. No.: 10/899,983

(22) Filed: Jul. 27, 2004

(65) Prior Publication Data

US 2006/0023363 A1    Feb. 2, 2006

(51) Int. Cl.
    *G11B 5/48*    (2006.01)
(52) U.S. Cl. .................................... 360/244.6
(58) Field of Classification Search ............... None
    See application file for complete search history.

(56) References Cited

U.S. PATENT DOCUMENTS

| | | | | |
|---|---|---|---|---|
| 5,689,389 | A  * | 11/1997 | Braunheim | 360/244.6 |
| 6,183,841 | B1 * | 2/2001 | Hanrahan et al. | 360/244.6 |
| 7,042,680 | B1 * | 5/2006 | Zhang et al. | 360/244.6 |

* cited by examiner

*Primary Examiner*—R. S. Tupper

(57) ABSTRACT

A disc-drive assembly including an actuator arm, a load beam and a swage mount. The actuator arm has a thickness ($T_A$), an arm tip with a width ($W_A$), and arm-hole with a diameter ($D_A$) in the actuator arm. The load beam has a load beam hole. The swage mount has a flange with a width ($W_F$). The swage mount has a hub with an outer hub diameter ($D_{OD}$), extending from the one side of the flange. The outer hub diameter ($D_{OD}$) of the hub is less than 2.54 mm. The flange width ($W_F$) divided by the hub outer diameter is greater than 2.0. The ratio of the outer hub diameter ($D_{OD}$) to the actuator arm thickness ($T_A$) is less than 1.5, and the ratio of the diameter of the arm hole ($D_A$) to the width of the arm tip ($W_A$) is less than 0.5.

27 Claims, 4 Drawing Sheets

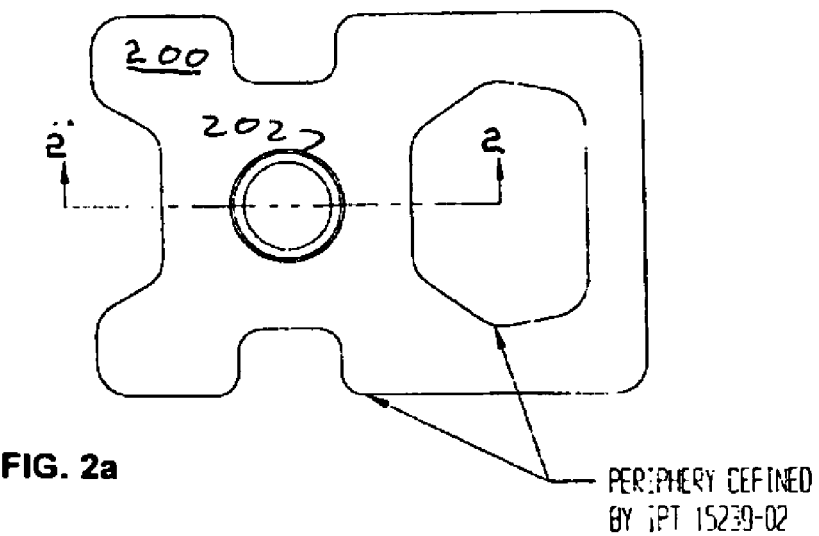
FIG. 2a
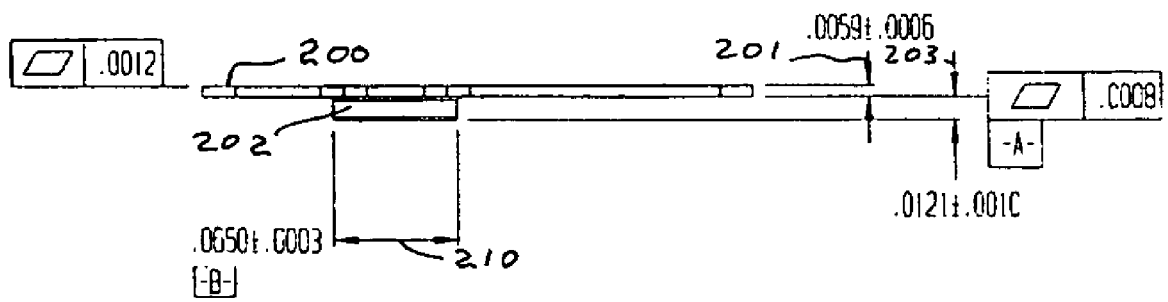
FIG. 2b
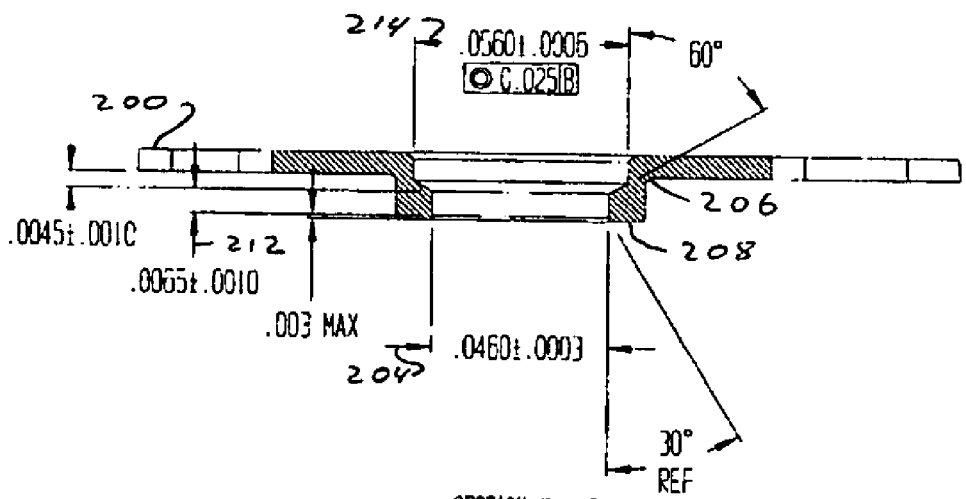
FIG. 2c  SECTION 2-2

FIGURE 4

| SYMBOL | NAME | Typical Prior Art | | Micro-Hub Embodiment B | | Micro-Hub Embodiment B | |
|---|---|---|---|---|---|---|---|
| | | (in) | (mm) | (in) | (mm) | (in) | (mm) |
| $L_F$ | Flange Length | 0.200 | 5.080 | 0.200 | 5.080 | 0.200 | 5.080 |
| $W_F$ | Flange Width | 0.200 | 5.080 | 0.200 | 5.080 | 0.200 | 5.080 |
| $T_F$ | Flange Thickness | 0.0059 | 0.150 | 0.0059 | 0.150 | 0.0059 | 0.150 |
| $D_{CB}$ | Counterbore Diameter | 0.0935 | 2.375 | 0.0730 | 1.854 | 0.0730 | 1.854 |
| $D_{ID}$ | Hub Inner Diameter | 0.0844 | 2.145 | 0.0600 | 1.524 | 0.0600 | 1.524 |
| $D_{OD}$ | Hub Outer Diameter | 0.1075 | 2.731 | 0.0850 | 2.159 | 0.0850 | 2.159 |
| $H_H$ | Hub Height | 0.0106 | 0.270 | 0.0106 | 0.269 | 0.0106 | 0.269 |
| $H_{IS}$ | Hub Inner Depth | 0.0045 | 0.114 | 0.0045 | 0.115 | 0.0045 | 0.115 |
| $H_{cb}$ | Counterbore Depth | 0.0015 | 0.038 | 0.0050 | 0.127 | 0.0050 | 0.127 |
| $W_H$ | Hub Radial Width | 0.0115 | 0.293 | 0.0153 | 0.388 | 0.0153 | 0.388 |
| $T_A$ | Arm Tip Thickness | 0.0400 | 1.016 | 0.0400 | 1.016 | 0.0400 | 1.016 |
| $W_A$ | Arm Tip Width | 0.200 | 5.080 | 0.200 | 5.080 | 0.150 | 3.810 |
| $D_A$ | Arm Hole Diameter | 0.1102 | 2.800 | 0.0866 | 2.200 | 0.0866 | 2.200 |
| | RATIO: $W_F / D_{OD}$ | 1.86 | | 2.35 | | 2.35 | |
| | RATIO: $W_F / W_A$ | 1.00 | | 1.00 | | 1.33 | |
| | RATIO: $D_{OD} / T_A$ | 2.69 | | 2.13 | | 2.13 | |
| | RATIO: $D_A / W_A$ | 0.55 | | 0.43 | | 0.58 | |

MICRO-HUB SWAGE MOUNT FOR ATTACHMENT OF SUSPENSION ASSEMBLY IN HARD DISK DRIVE

BACKGROUND OF THE INVENTION

1. Field of the Invention

This invention relates to head stack assemblies for supporting read/write heads adjacent rotating disks in disk drives and more particularly, to a swage mount attachment having a micro-hub for attaching a head suspension assembly to an actuator arm.

2. Description of the Prior Art

In hard disk drives data are stored on magnetizable surfaces of a plurality of rotating disks that are mounted in a coaxial stack on a housing of the drive. Transducer heads that write data to and read data from the disk surfaces are supported by an actuator that is mounted on the same housing and can be actuated to position the transducer heads in alignment with concentric data tracks defined on the disks. Each transducer head is attached to one end of a head suspension that is connected to an actuator arm that extends from the actuator body. Each suspension includes a flexible load beam constructed of light sheet steel that has a bend formed in it. The load beam acts as a spring that forces the head against the disk surface with an accurate load force or "gram load". An air bearing caused by the rotating disks lifts the heads slightly off of the disks so that the heads fly at a specific height across the disk surfaces. The air bearing force is counteracted by the suspension gram load.

The head suspension is attached to an actuator arm using a swage mount that forms a part of the head suspension. The swage mount includes a flat flange portion and a cylindrical hub portion or boss. The swage mount hub is passed through a load beam clearance hole and the flange is spot welded to the load beam. Alternatively, the hub and load beam clearance hole are aligned and the flange is welded on the opposite side. The combined swage mount, load beam and a flexure make up the head suspension, and the suspension has the hub of the swage mount extending beyond the load beam and concentric with the clearance hole.

The hubs of the suspensions are inserted into actuator arm holes formed through actuator arms extending from an actuator body. In the middle actuator arms, the hubs of two suspensions enter the arm boss hole from each end of the hole, so that the transducer heads of the suspensions face in opposing directions. A swage ball is passed through the concentric cylindrical hubs to force the peripheries of the hubs to expand (swage) into tight interference engagement with the inner peripheries of the actuator arm holes.

Problems with this method of mounting transducer heads have arisen as the need for increased data storage capacity in hard disk drives has grown and the size of the disk drive has decreased to fit in small lap top computers. The problem of forming a strong connection between the actuator arms and the transducer suspensions has been made more difficult as the size of the components has become smaller. In the prior art, relatively high swaging forces are needed to insure that a swage mount makes a strong connection with the actuator arm boss hole. As the parts get smaller and thinner, these high forces cause unacceptable large distortions in the flange portion of the swage mount which then distort the load beam and cause gram load changes. These distortions can also adversely affect the resonance characteristics of the assembly such that the head does not stay on track during reading and writing operations.

One method for reducing the overall drive size is to reduce the size of the stacked vertical joint connecting the load beam to the actuator assembly. For example, in U.S. Pat. Nos. 6,183,841 and 5,689,389, a low profile swage mount fastener is used to connect a load beam to an actuator arm of an actuator assembly. Because the swage mount fastener has a low profile, the overall height of the disc drive may be reduced. However, a disadvantage of using a low profile swage mount fastener is that as performance demands increase, a low profile swage mount fastener may provide less torque retention than is required to withstand the forces on the load beam.

In U.S. Pat. Nos. 6,183,841 and 5,689,389 the torque retention characteristics of a low profile swage mount fastener were increased by modifying the internal geometry of the swage mount. However, the level of torque retention that can be achieved solely by modifying the swage mount design is limited. Without increased torque retention values, the acceleration rate a load beam can withstand is limited, which imposes an upper limit on the speed at which the read/write head can be positioned. This in turn will limit the overall access time a disc drive can achieve, a key parameter of disc drive performance.

U.S. Pat. Nos. 6,231,689 and 6,351,349 are directed at overcoming shortcomings of the prior art. Each patent provides a surface hardened swage mount, a method of hardening the metal from which such parts are made, and for connecting a disc drive actuator arm to a load beam, which results in an increased torque retention characteristic of the swage mount.

As described above, as swage mounts get smaller to accommodate the geometries of smaller disk drives, reduced retention torque becomes a problem and this has given rise to a need to increase retention torque. The need to increase retention torque is a problem especially with nickel-plated aluminum actuator arms. A swage mount is disclosed in co-pending application Ser. No. 10/037,643 "Surface Hardened Swage Mounts for Improved Performance" of Ernest Swayney and Steve Braunheim (incorporated herein by reference) in which the outer surface of the hub includes numerous protrusions that are less than approximately 50 microns in height. The protrusions are primarily comprised of a material (such as a carbide or a nitride) which is different from the stainless steel hub. Preferably, the protrusions are substantially harder (such as at least 50 hardness Vickers harder) than the base material of the hub. The purpose of the protrusions is to provide greater torque retention when the swage mount is swaged to an actuator arm.

During manufacture, chromium carbide or chromium nitride is precipitated out of a base metal onto the outer surface of the hub resulting in the surface protrusions. The surface protrusions stick out of the hub outer surface and grab into the aluminum actuator arm boss hole when the hub is swaged. These and other methods of creating hardened modules on the outer hub surface can boost retention torque by 60%–100%.

Swage mounts containing carbides provide higher retention torque than nitrided parts, but tend to shed a higher volume of particles from the surface. Due to the present emphasis on cleanliness within the industry, this currently limits the use of carbides, the most effective precipitate.

During current manufacturing of swage mounts, the swage mounts are subjected to processes that remove burrs, which may include tumbling using porcelain beads. The reason the swage mount is deburred is that a burr may flake off and contaminate the drive mechanism. Furthermore, a burr can cause the swage mount to stand off and not mate with the load beam properly. Tumbling to deburr the swage mount using porcelain beads that are predominately aluminum oxide may result in aluminum oxide particles coming loose and becoming embedded in the surface of the disk. Studies of failed disk drives have shown that aluminum oxide separating from the beads has been found on the disk surface at the site of a head crash. Even if the head does not crash, an aluminum oxide particle embedded on the disk can cause a thermal asperity. As the head passes over the particle, the head may be damaged by heat from the friction or an inaccurate reading may occur.

Manufacture of the material used to fabricate the swage mounts, typically stainless steel, often results in the introduction of metal oxides such as alumina and magnesia into the melt. These oxides and other contaminates in the base metal can form inclusions that may potentially be exposed at the surface of the swage mount after manufacturing. These inclusions, should they become loose and fall from the base material, can pose a threat to drive operation in the form of a head crash or thermal asperity, as described above.

Copending application Ser. No. 10/241,609 of Damon D. Brink, et al "Plated Base Plate For Suspension Assembly In Hard Disk Drive" (incorporated herein by reference) discloses a method to cover the imbedded particles and material inclusions, to prevent them from coming loose from the swage mounts during service. The hub is plated with metal to improve the cleanliness and retention torque of the swage mounts. When applicable, the metal plating is used to prevent the protrusions from separating from the hub and contaminating an assembled disk drive. The plating deposit may include, but is not limited to, Ni, Cr, Pt, Pd, Rh, Au, and Ag, or combinations or layers thereof. The hub outer surface prior to plating may be provided with surface protrusions that increase torque retention when the hub is swaged. In all swage mounts, with or without surface protrusions, the microstructure and associated tribological characteristics of the metal plating is such that retention torque is increased.

It is desirable to provide an optimum swage mount geometry in which the gram load and resonance changes inherent in swaging are reduced and a large retention torque is created even in low hub height configurations that offer limited retention torque in a standard hub geometry.

With the above methods of increasing retention torque now available it is therefore possible and desirable to provide a swage mount that has a smaller hub than a conventional swage mount, a torque retention capability comparable to the prior art and a reduced pre-load change caused by the swaging process.

SUMMARY OF THE INVENTION

Briefly, the invention is concerned with a micro-hub swage mount for attachment of a suspension assembly to an actuator arm in a hard disk drive. The swage mount includes a flange having a flange width ($W_F$) and a hub having an outer diameter ($D_{OD}$).

The hub and flange dimensions are such that:

(1) the outer hub diameter ($D_{OD}$) is less than 2.54 mm, and
(2) the flange width ($W_F$) divided by the hub outer diameter is greater than 2.0.

In accordance with an aspect of the invention:

(3) the ratio of outer hub diameter ($D_{OD}$) to actuator arm thickness ($T_A$) is less than 2.5, and (4) the ratio of the diameter of the arm hole ($D_A$) to the width of the arm tip ($W_A$) is less than 0.5.

The invention has the advantage that gram load and resonance changes inherent in swaging are reduced and a large retention torque can be created even in low hub height configurations that offer limited retention torque in a standard hub geometry.

BRIEF DESCRIPTION OF THE DRAWINGS

The invention will be described in greater detail with reference to the drawings in which:

FIG. 2a is a side elevation view of a swage mount of Embodiment A of the present invention;

FIG. 2b is bottom view of the swage mount of FIG. 1a;

FIG. 2cc is side elevation cross-sectional view of the swage mount of FIG. 2b along the view line 2c—2c;

FIG. 3b is bottom view of the swage mount of FIG. 3a;

Figure 1:
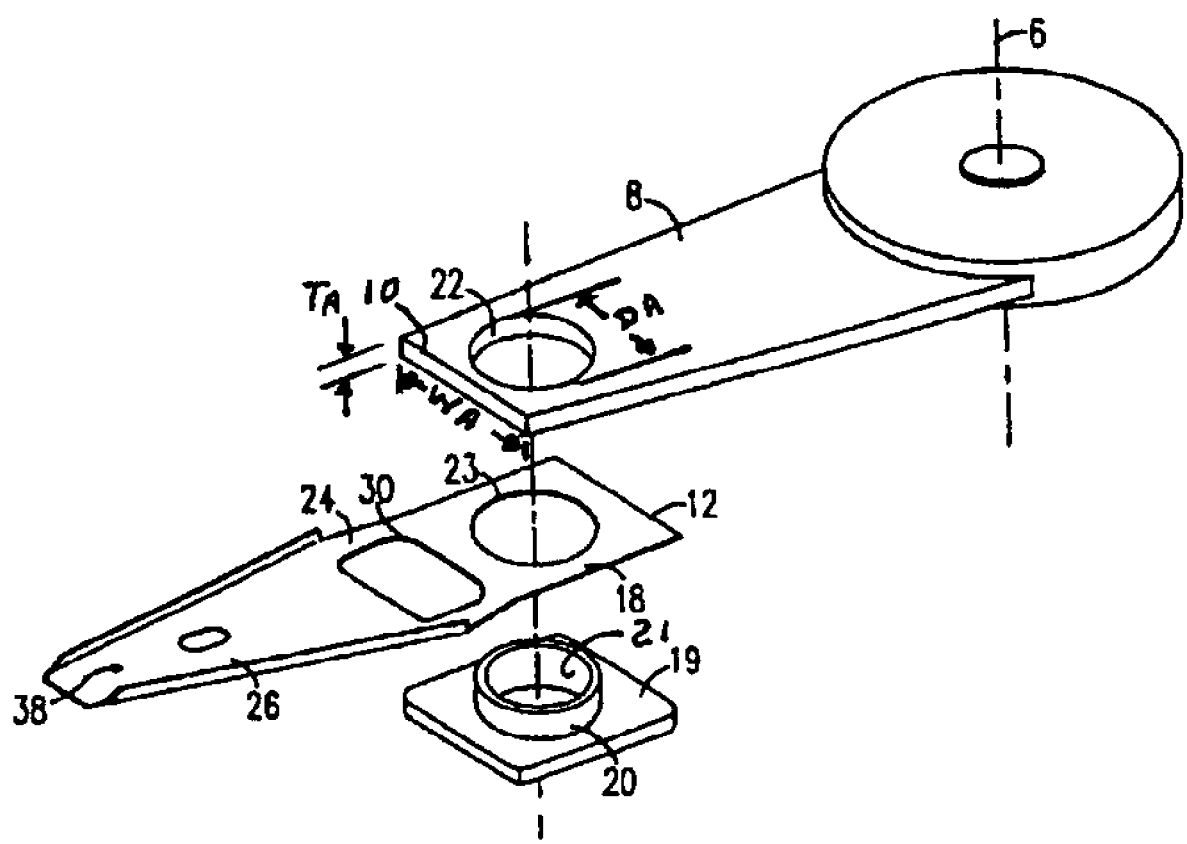
FIG. 1 is an exploded view of a disk drive magnetic head suspension in which the present invention is embodied.

In these figures, similar numerals refer to similar elements in the drawing. It should be understood that the sizes of the different components in the figures may not be to scale, or in exact proportion, and are shown for visual clarity and for the purpose of explanation. Dimensions in the drawings are given in inches.

DETAILED DESCRIPTION OF THE INVENTION

Refer to FIG. 1, which illustrates a disc drive assembly including an actuator arm 8, a load beam 12 and a swage mount 19. A fully assembled disk drive has an actuator arm assembly and a stack of spaced-apart disks rotatable about a separate axis. The arm assembly includes a plurality of actuator arms, which extend into the spaces between the disks. One such actuator arm 8 is shown in FIG. 1. Attached to the actuator arm near the tip 10 is a magnetic head suspension 12, 19. The actuator arm 8 when assembled in a stack with a number of identical actuator arms rotates about the actuator arm axis 6.

The magnetic head suspension comprises a resilient load beam 12, a flexure (not shown) and a slider (not shown) on the under side of the load beam 12. The load beam 12 includes a base section 18 having a load beam boss hole 23. The load beam 12 includes a resilient section 24 located between the base section 18 and a protrusion section 26 of the load beam 12. The resilient section 24 is formed to create an angular offset between the base section 18 and protrusion section 26. The degree of bending determines the downward preload force of the slider toward a disk surface. The geometry of the load beam in resilient section 24 and/or the size of an aperture 30 in the resilient section 24 establishes the resilience of the load beam 12. A dimple 38 is formed in the load beam 12, or on the flexure, and is urged against the backside of the slider through a clearance and contributes to a gimbaling action of the slider. A transducer is disposed at the rear edge of the slider The actuator arm 8 and load beam 12 of the actuator arm assembly are connected end to end by a swage mount (also called a base plate) which includes a flat flange portion 19 and a cylindrical hub portion or boss 20.

The hub 20 has an outer hub diameter ($D_{OD}$). The actuator arm 8 has a thickness ($T_A$). The arm hole 22 has a diameter ($D_A$). The arm tip 10 of actuator arm 8 has a width ($W_A$).

There is an actuator arm-hole 22 with a diameter ($D_A$) in the actuator arm 8. The load beam 12 has a load beam hole 23. The swage mount 19 has a flange with a first side 19 and a second side, the flange having a flange width ($W_F$). The swage mount 19 has a hub 20 with an outer hub diameter ($D_{OD}$), extending from the first side 19 of the flange. The outer hub diameter ($D_{OD}$) of the hub is less than 2.54 mm. The flange width ($W_F$) divided by the hub outer diameter is greater than 2.0. The swage mount 19 is mounted with respect to the actuator arm 8 and the load beam 12 such that the hub 21 is in registration with the actuator arm-hole 22 and the load beam hole 23, forming an interference fit. The ratio of the outer hub diameter ($D_{OD}$) to the actuator arm thickness ($T_A$) is less than 2.5, and the ratio of the diameter of the arm hole ($D_A$) to the width of the arm tip ($W_A$) is less than 0.5.

A top view of the swage mount is shown in FIG. 2b. In assembling the actuator arm, the hub 20 is inserted through the load beam boss hole 23 and the flange portion 19 is welded to the load beam 18. The hub 20 is then inserted through an actuator arm boss hole 22. Using a swage machine, a swage ball is driven through an inner barrel 21 within the hub 20. The swage ball exerts pressure on the hub 20, which expands (swages) into the boss hole 22 in the actuator arm 8. The expanded hub rigidly connects the hub and attached load beam to the actuator arm boss hole. The expanded hub 20 creates a very tight friction fit against the sides of the boss hole 22. To ensure a tight fit, the length of the hub 20 is such that sufficient contact exists between the outer portion of the hub 20 and the inner portion of the boss hole 22. As the hub plastically deforms, it hardens, which is desirable for maintaining a press fit in the actuator arm boss hole.

Alternatively, the hub may be dimensioned such that instead of swaging, the hub is press-fitted into the actuator arm boss hole, as described in U.S. Pat. No. 6,141,868. An advantage of the press-fit method is that it allows the use of swage mounts to connect head suspensions to actuator arms of a head stack assembly without swaging or plastically deforming the stainless steel hub portion of the base plate to create a press fit into the actuator arm. Press-in swage mounts reduce the large stresses and deformations associated with swaging that result in gram load change. Furthermore, press-in swage mounts eliminate the gram load and resonance change differences that occur between up and down heads resulting from the different mechanics of conventional tension and compression swaging.

Refer to FIG. 2a, which is a side elevation of the swage mount of Embodiment A of the present invention, FIG. 2b which is bottom view of the swage mount of FIG. 2a, and FIG. 2c which is side elevation cross-sectional view of the swage mount of FIG. 2b along the view line 2b–12b. The swage mount includes a flat flange portion 200 and a cylindrical hub portion or boss 202. The hub has an inner barrel with an inner diameter 204. The inner diameter is perpendicular to the plane of the swage mount flange 200. The hub extends from a region 106 at which the hub meets the flange to an outer end 208 of the hub.

The swage mount has the following parameters: a swage mount thickness, $T_F$, (201), hub height, $H_H$, (203), hub inner diameter, $D_{ID}$, (204), swage mount length, $L_F$, (205), swage mount width, $W_F$, (207), hub outer diameter, $D_{OD}$, (210), hub inner surface depth, $H_{IS}$, (212), swage mount opening diameter, $D_{CB}$, (214), hub radial width, $W_H$, which is the hub outer diameter minus the hub inner diameter ($D_{OD}$–$D_{ID}$), and a counter bore depth $H_{CB}$.

In a fully assembled magnetic disk drive, an actuator arm and head suspension, which are elements of an actuator arm assembly, are connected end to end by a swage mount. In assembling the suspension, the hub 202 is inserted through a load beam boss hole 23 in a load beam 12 (shown in FIG. 1), which is part of the suspension. The flange portion 1200 is welded to the load beam. The hub is then inserted into an actuator arm boss hole 22 in an actuator arm 8. The combined swage mount, load beam and a flexure make up a head suspension, and the suspension typically has the hub of the swage mount extending through and beyond the load beam clearance hole. Alternatively, the hub and load beam clearance hole are aligned and the flange is welded on the opposite side. A swage ball is passed through the center inner barrel of the hub 202 causing pressure to be applied to cause the hub 202 to expand into the boss hole in the actuator arm, rigidly connecting the hub and attached load beam to the actuator arm boss hole.

Figure 3A:
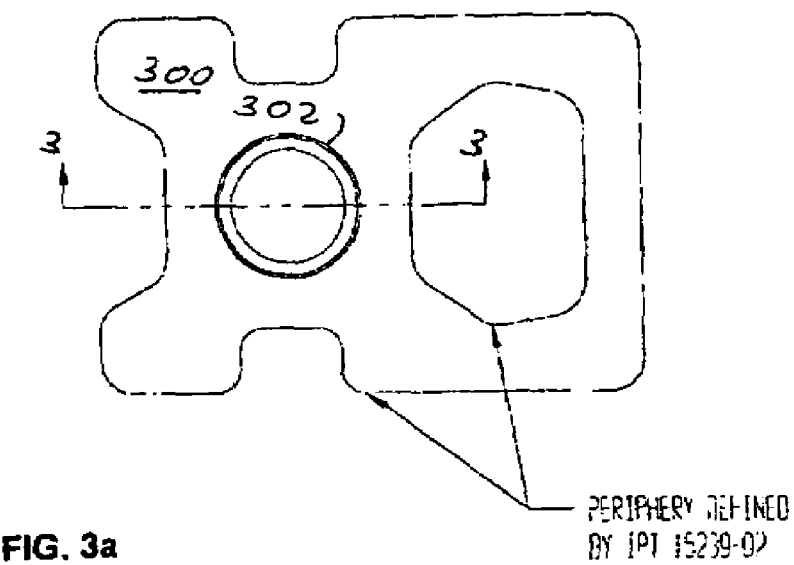
FIG. 3a is a side elevation of the swage mount of Embodiment B of the present invention.
Figure 3B:
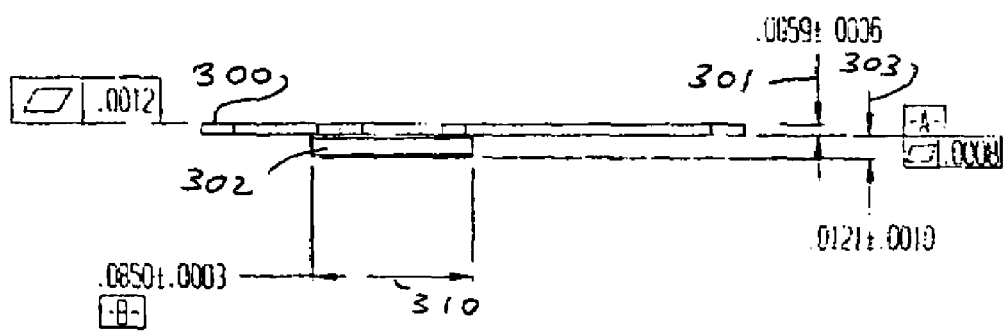
Figure 3C:
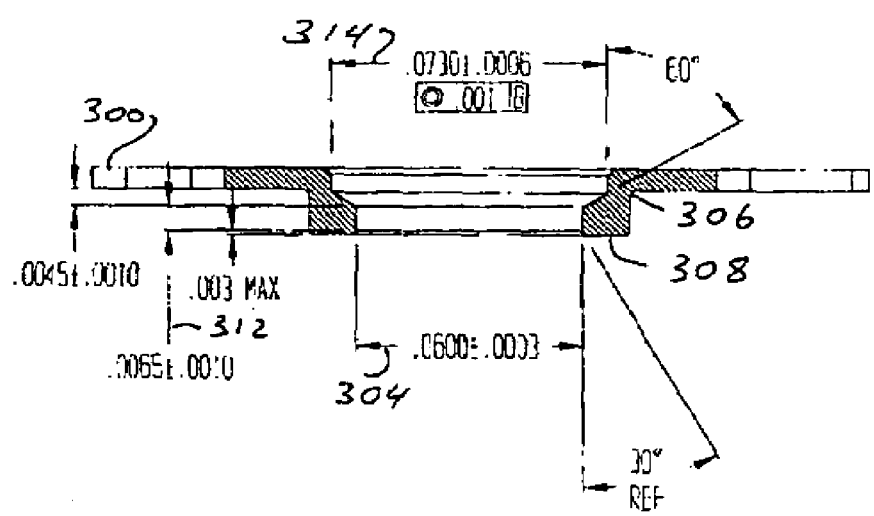
FIG. 3c is side elevation cross-sectional view of the swage mount of FIG. 3b along the view line 3c–3c; and, FIG. 4 is a table comparing two instances of Embodiment B of the present invention with the prior art.

Refer to FIG. 3a, which is a side elevation of the swage mount of Embodiment B of the present invention, FIG. 3b which is bottom view of the swage mount of FIG. 3a and FIG. 3c which is side elevation cross-sectional view of the swage mount of FIG. 3b along the view line 3b—3b. The swage mount includes a flat flange portion 300 and a cylindrical hub portion or boss 302. The hub has an inner barrel with an inner diameter 304. The inner diameter is perpendicular to the plane of the swage mount flange 300. The hub extends from a region 206 at which the hub meets the flange to an outer end 308 of the hub.

The swage mount has the following parameters: a swage mount thickness, $T_F$, (301), hub height, $H_H$, (303), hub inner diameter, $D_{ID}$, (304), swage mount length, $L_F$, (305), swage mount width, $W_F$, (307), hub outer diameter, $D_{OD}$, (310), hub inner surface depth, $H_{IS}$, (312), swage mount opening diameter, $D_{CB}$, (314), hub radial width, $W_H$, which is the hub outer diameter minus the hub inner diameter ($D_{OD}$–$D_{ID}$), and a counter bore depth $H_{cb}$.

The optimum parameters in accordance with both embodiments of the invention are such as to satisfy the following (1) the outer hub diameter ($D_{OD}$) is less than 2.54 mm,
(2) the flange width ($W_F$) divided by the hub outer diameter ($D_{OD}$) is greater than 2.0,
(3) the ratio of outer hub diameter ($D_{OD}$) to actuator arm thickness ($T_A$) is less than 2.5, and
(4) the ratio of the diameter of the arm hole ($D_A$) to the width of the arm tip ($W_A$) is less than 0.5

In FIG. 2, $W_F$=5.08 and, $D_{OD}$=1.651 and in FIG. 3, $W_F$=5.08 and $D_{OD}$=2.159, in millimeters. Those skilled in the art will realize that $D_{OD}$ can be dimensioned between 1.651 and 2.159 millimeters, inclusive.

Refer to FIG. 4, which is a table, wherein the dimensions of two instances of Embodiment B of the present invention are compared with the prior art.

In the prior art, the flange width to hub diameter ratio $W_F/D_{OD}$ is less than 2 whereas in a swage mount made in accordance with the principles of the present invention, the ratio is greater than 2.

The swaging method entails clamping the actuator body in place in a fixture to prevent outward bending of the outermost actuator arms. A number of head suspension assemblies are placed in the actuator body such that swage mount hubs in the suspensions are in vertical alignment with a corresponding boss hole in an actuator arm extending from an actuator body (not shown). The head suspension assemblies are radially aligned with a pin that passes through tooling holes in the distal end of the suspensions and into the fixture. A swage ball is passed through the center inner barrel of the vertically aligned hubs of the swage mounts. The swage ball exerts pressure that causes the hubs to expand into the corresponding boss hole in the actuator arm, rigidly connecting each hub and attached load beam to a wall of the corresponding actuator arm boss hole.

The principles of the invention have been described for swage mounts that are swaged. However, those skilled in the art will realize that the method of manufacture described herein can be utilized to create swage mounts for press-in fitting. U.S. Pat. No. 6,141,868 (application Ser. No. 09/003,872) describes a novel method of assembling a disk drive using a press fitted swage mount. The method comprises steps of clamping an actuator body in place in a fixture to prevent outward bending of the outermost actuator arms, placing a number of head suspension assemblies in the actuator body such that swage mount hubs in the suspensions are in alignment with corresponding boss holes in actuator arms extending from the actuator body, radially aligning the head suspension assemblies with a pin that passes through tooling holes in the suspensions and into the fixture, inserting a tool between the actuator arms and in alignment with the swage mounts, and activating the tool a reach sufficient to urge each swage mount hub into a corresponding boss hole. The tool comprises closed jaws and the tool is activated by opening the jaws by, for example, driving a wedge between the closed jaws. An advantage of swage mount constructed in accordance with the teachings the present invention is that it allows the use of a swage mount having a micro-hub with the press-in method and apparatus.

While the invention has been particularly shown and described with reference to preferred embodiments thereof, it will be understood by those skilled in the art that the foregoing and other changes in form and detail may be made therein without departing from the scope of the invention.

What is claimed is:

1. A disk drive apparatus comprising:
a swage mount;
said swage mount including a flange having a flange width ($W_F$); and,
a hub having an outer diameter ($D_{OD}$);
said hub outer diameter being less than 2.54 mm, and
said flange width divided by said hub outer diameter being greater than 2.0.

2. The disk drive apparatus of claim 1 further comprising:
an actuator arm having a tip width ($W_A$)
a ratio of said flange width ($W_F$) to said actuator arm width ($W_A$) of greater than 1.0.

3. The disk drive apparatus of claim 1 further comprising:
an actuator arm having an actuator arm thickness ($T_A$) and an actuator arm hole with a diameter ($D_A$);
an arm tip of said actuator arm having a width ($W_A$);
a ratio of said outer hub diameter ($D_{OD}$) to said actuator arm thickness ($T_A$) being less than 1.5, and
a ratio of said diameter ($D_A$) of said arm hole to said width of said arm tip ($W_A$) being less than 0.5.

4. The apparatus of claim 1 wherein, in millimeters:
$W_F$=5.08; and,
$D_{OD}$=1.651.

5. The apparatus of claim 1 wherein, in millimeters:
$W_F$=5.08; and,
$D_{OD}$=2.159.

6. The apparatus of claim 1 wherein, in millimeters:
$W_F$=5.08; and,
$D_{OD}$ is between 1.651 and 2.159, inclusive.

7. The apparatus of claim 3 wherein, in millimeters:
$W_F$=5.08; and,
$D_{OD}$=1.651.

8. The apparatus of claim 3 wherein, in millimeters:
$W_F$=5.08; and,
$D_{OD}$=2.159.

9. The apparatus of claim 3 wherein, in millimeters:
$W_F$=5.08; and,
$D_{OD}$ is between 1.651 and 2.159, inclusive.

10. A disc drive assembly, comprising:
an actuator arm having an actuator arm thickness ($T_A$);
an arm tip of said actuator arm having a width ($W_A$);
said actuator arm having an actuator arm hole with a diameter ($D_A$);
a load beam having a load beam hole; and
a swage mount;
said swage mount having a flange with a first side and a second side, said flange having a flange width ($W_F$);
said swage mount having a hub with an outer hub diameter ($D_{OD}$), said hub extending from said first side of said flange;
said outer hub diameter ($D_{OD}$) of said hub being less than 2.54 mm;
said flange width ($W_F$) divided by said hub outer ($D_{OD}$) diameter being greater than 2.0.

11. The disc drive assembly, of claim 10 wherein:
said swage mount is mounted with respect to said actuator arm and said load beam;
said hub being in registration with said actuator arm hole and said load beam hole, forming an interference fit.

12. The disc drive assembly, of claim 10 wherein:
a ratio of said outer hub diameter ($D_{OD}$) to said actuator arm thickness ($T_A$) is less than 1.5, and
a ratio of said diameter of said arm hole ($D_A$) to said width of said arm tip ($W_A$) is less than 0.5.

13. The disc drive assembly, of claim 11 wherein:
a ratio of said outer hub diameter ($D_{OD}$) to said actuator arm thickness ($T_A$) is less than 1.5, and
a ratio of said diameter of said arm hole ($D_A$) to the width of said arm tip ($W_A$) is less than 0.5.

14. The apparatus of claim 10 wherein, in millimeters:
$W_F$=5.08; and,
$D_{OD}$=1.651.

15. The apparatus of claim 10 wherein, in millimeters:
$W_F$=5.08; and,
$D_{OD}$=2.159.

16. The apparatus of claim 10 wherein, in millimeters:
$W_F$=5.08; and,
$D_{OD}$ is between 1.651 and 2.159, inclusive.

17. The apparatus of claim 11 wherein, in millimeters:
$W_F$=5.08; and,
$D_{OD}$=1.651.

18. The apparatus of claim 11 wherein, in millimeters:
$W_F$=5.08; and,
$D_{OD}$=2.159.

19. The apparatus of claim 11 wherein, in millimeters:
$W_F$=5.08; and,
$D_{OD}$ is between 1.651 and 2.159, inclusive.

20. The apparatus of claim 12 wherein, in millimeters:
$W_F$=5.08; and,
$D_{OD}$=1.651.

21. The apparatus of claim 12 wherein, in millimeters:
$W_F$=5.08; and,
$D_{OD}$=2.159.

22. The apparatus of claim 12 wherein, in millimeters:
$W_F$=5.08; and,
$D_{OD}$=2.159.

23. The apparatus of claim 12 wherein, in millimeters:
$W_F$=5.08; and,
$D_{OD}$ is between 1.651 and 2.159, inclusive.

24. A disc drive assembly, comprising:
an actuator arm having an actuator arm thickness ($T_A$);
an arm tip of said actuator arm having a width ($W_A$);
said actuator arm having an actuator arm hole with a diameter ($D_A$);
a load beam having a load beam hole; and
a swage mount;
said swage mount having a flange with a first side and a second side, said flange having a flange width ($W_F$);
said swage mount having a hub with an outer hub diameter ($D_{OD}$), said hub extending from said first side of said flange;
said swage mount being mounted to one of said actuator arm and said load beam such that said hub is in registration with said actuator arm hole and said load beam hole, forming an interference fit;
said outer hub diameter ($D_{OD}$) of said hub being less than 2.54 mm;
said flange width ($W_F$) divided by said hub outer diameter being greater than 2.0.
a ratio of said outer hub diameter ($D_{OD}$) to said actuator arm thickness ($T_A$) is less than 1.5,
a ratio of said diameter of said arm hole ($D_A$) to said width of said arm tip ($W_A$) is less than 0.5;
a ratio of said outer hub diameter ($D_{OD}$) to said actuator arm thickness ($T_A$) is less than 1.5,
a ratio of said diameter of said arm hole ($D_A$) to the width of said arm tip ($W_A$) is less than 0.5.

25. The apparatus of claim 24 wherein, in millimeters:
$W_F$=5.08; and,
$D_{OD}$=1.651.

26. The apparatus of claim 24 wherein, in millimeters:
$W_F$=5.08; and,
$D_{OD}$=2.159.

27. The apparatus of claim 24 wherein, in millimeters:
$W_F$=5.08; and,
$D_{OD}$ is between 1.651 and 2.159, inclusive.

* * * * *